H. R. HUIE.
Gang Plow.
No. 83,283. Patented Oct. 20, 1868.
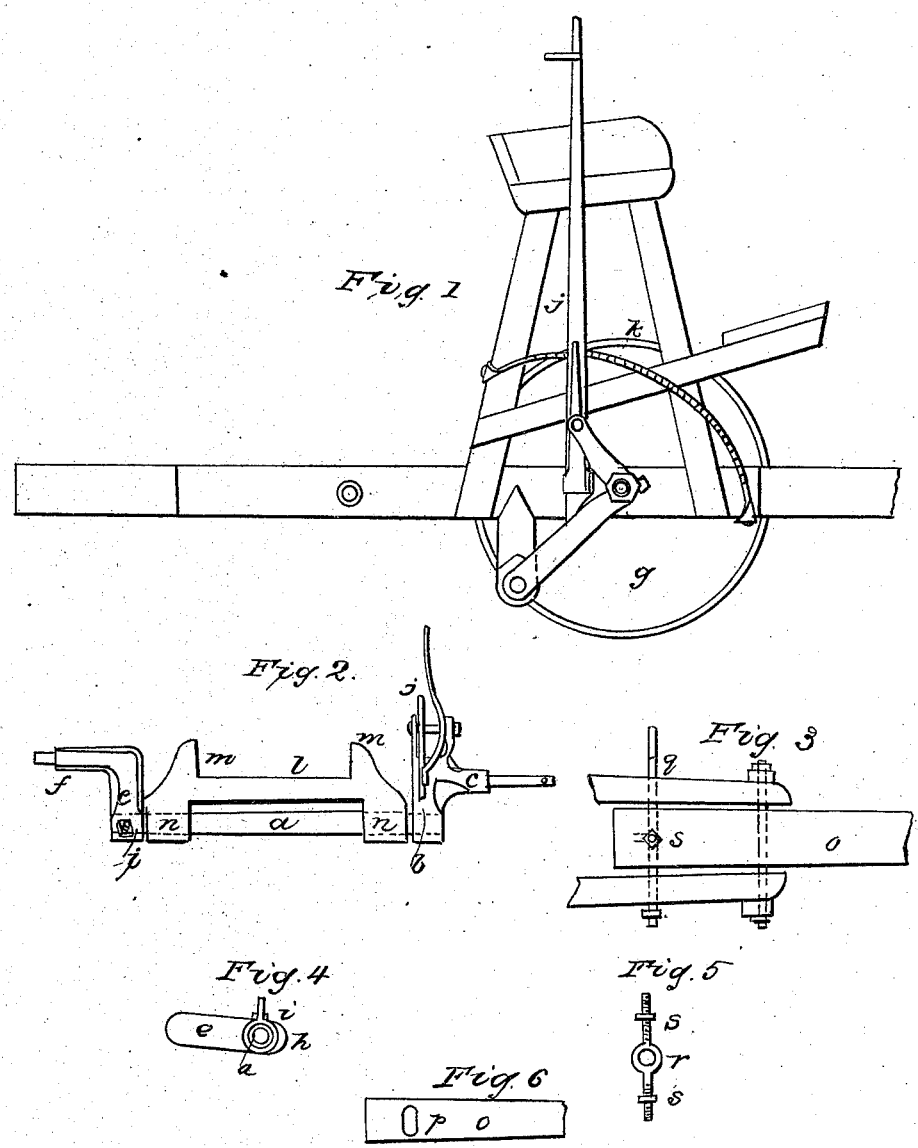

UNITED STATES PATENT OFFICE.

H. R. HUIE, OF HAYWARD'S, CALIFORNIA.

IMPROVEMENT IN GANG-PLOWS.

Specification forming part of Letters Patent No. 83,283, dated October 20, 1868.

*To all whom it may concern:*

Be it known that I, H. R. HUIE, of Hayward's, Alameda county, in the State of California, have invented a certain new and useful Improvement on Gang-Plows; and I do hereby declare that the following is a full, clear, and exact description of the same, reference being had to the accompanying drawings, and to the letters and marks thereon, which said drawings form part of this specification, and show certain parts of a gang-plow to which my improvement relates—

Figure 1 being a side view of the frame and upper parts of a plow, and Figs. 2, 3, 4, 5, and 6 certain parts in detail.

In all of these figures, where like parts are shown, like marks and letters are used to indicate the parts.

My improvement relates to that class of gang-plows where the crank-axle is used for raising and lowering the plow-frame, and has special reference to facilities for adapting the one wheel to the furrow and to the adjustment of the tongue.

The axle $a$ is at its one end firmly united to the arm $b$ and spindle $c$ of the unbroken-soil wheel, while at its other end, it is connected to the arm $e$ and the spindle $f$ of the furrow-wheel $g$ by an eyebolt, $h$, more distinctly shown by 4 of the drawings. By simply turning the nut $i$ of this eyebolt the hold of the arm upon the shaft is loosened, and the wheel may then readily be adjusted to the elevation desired, and the nut again tightened.

The crank-shaft can be operated by the lever $j$, which fits into the toothed segment $k$, and thus the plow-frame be readily raised or lowered, or changed in relative elevation to the wheels and the ground.

The axle $a$ is connected to the frame of the plow through the plate $l$, which, with its lugs or ears $m$ and boxes $n$, is cast as one piece of metal. This affords a very convenient, cheap, and strong means for the attachment of the axle to the frame, and allows of very easy separation of the parts when required, as the axle may be taken out from the boxes by simply loosening the eyebolt $h$.

The tongue $o$ is so fitted to the frame-bars that it may be moved up or down, or to the one or the other side. This is effected by having a vertical slot, $p$, Fig. 6, near the end of the tongue, which allows play on the crank-bolt $q$, the crank-bolt passing through the eyebolt $r$, a screw-thread being on the crank-bolt and in the eye. By turning the crank-bolt the one way or the other, the tongue will readily be moved to the one or the other side, and by the adjustment of the nuts $s$ and $t$ of the eyebolt the tongue may be elevated or lowered.

What I claim as my invention, and desire to secure by Letters Patent, is—

1. Securing the arm $e$ of the axle $f$ to the axle-tree $a$ by means of the eyebolt $i$, as shown and described.

2. The crank-bolt $q$, in combination with the eyebolt $r$ for adjusting the tongue, as herein set forth.

3. The arrangement and construction of the plate $l$, ears $m$, and boxes $n$, which allows of their being cast as one piece, as herein described.

This specification signed this 24th day of March, 1868.

H. R. HUIE.

Witnesses:
S. L. PALMER,
OTIS V. SAWYER.